United States Patent
Isozaki et al.

(10) Patent No.: US 7,615,295 B2
(45) Date of Patent: Nov. 10, 2009

(54) HYDROGEN GENERATOR AND FUEL CELL SYSTEM

(75) Inventors: Yoshiyuki Isozaki, Tokyo (JP); Yuusuke Sato, Tokyo (JP); Hiroshi Takeda, Ichikawa (JP)

(73) Assignees: Kabushiki Kaisha Toshiba, Tokyo (JP); Sud-Chemie Catalysts Japan, Inc., Tokyo (JP)

( * ) Notice: Subject to any disclaimer, the term of this patent is extended or adjusted under 35 U.S.C. 154(b) by 407 days.

(21) Appl. No.: 11/213,850

(22) Filed: Aug. 30, 2005

(65) Prior Publication Data

US 2006/0046112 A1   Mar. 2, 2006

(30) Foreign Application Priority Data

Aug. 30, 2004   (JP)   ............ P2004-250464
Aug. 29, 2005   (JP)   ............ P2005-247951

(51) Int. Cl.
*H01M 8/18*   (2006.01)
*B01J 7/00*   (2006.01)

(52) U.S. Cl. ............ 429/19; 48/61
(58) Field of Classification Search .......... 429/19; 48/61
See application file for complete search history.

(56) References Cited

U.S. PATENT DOCUMENTS

| | | | |
|---|---|---|---|
| 3,615,164 A | 10/1971 | Baker et al. | |
| 4,284,531 A * | 8/1981 | Simpson et al. | 502/74 |
| 6,183,895 B1 | 2/2001 | Kudo et al. | |
| 6,207,307 B1 | 3/2001 | Van Keulen | |
| 6,403,049 B1 | 6/2002 | Van Keulen et al. | |
| 6,475,655 B1 | 11/2002 | Nakanishi et al. | |
| 6,605,559 B1 * | 8/2003 | Yamada et al. | 502/63 |
| 6,913,738 B1 * | 7/2005 | Echigo et al. | 423/246 |
| 2004/0062961 A1 | 4/2004 | Sato et al. | |
| 2004/0247960 A1 | 12/2004 | Sato et al. | |
| 2005/0022450 A1 * | 2/2005 | Tan et al. | 48/198.3 |
| 2005/0096211 A1 | 5/2005 | Takeda et al. | |
| 2005/0096212 A1 | 5/2005 | Takeda et al. | |
| 2006/0046112 A1 | 3/2006 | Isozaki et al. | |

FOREIGN PATENT DOCUMENTS

JP   2001-96160   4/2001
JP   2002-68707   3/2002

OTHER PUBLICATIONS

Watson, G. H., "Methanation catalysts", Report No. ICTIS/TR Feb. 9, 1980, IEA Coal Research, London, 56 pages.*
U.S. Appl. No. 11/367,537, filed Mar. 6, 2006, Isozaki, et al.
U.S. Appl. No. 11/366,544, filed Mar. 3, 2006, Tezuka, et al.

(Continued)

*Primary Examiner*—Patrick Ryan
*Assistant Examiner*—Thomas H. Parsons
(74) *Attorney, Agent, or Firm*—Oblon, Spivak, McClelland, Maier & Neustadt, L.L.P.

(57) ABSTRACT

A fuel cell system is provided with: a fuel supplier supplying a fuel including dimethyl ether; a reforming catalyst causing a reforming reaction of the fuel into a reformed gas including hydrogen; a shift catalyst causing a shift reaction of the reformed gas; a methanation catalyst causing a methanation catalyst of the reformed gas; a hydrogenation catalyst causing a hydrogenation catalyst of the reformed gas; and a fuel cell using hydrogen formed the reforming reaction and the shift reaction from the fuel and oxygen included in an atmospheric air to generate electricity.

23 Claims, 4 Drawing Sheets

OTHER PUBLICATIONS

U.S. Appl. No. 11/387,970, filed Mar. 24, 2006, Kuwata, et al.
U.S. Appl. No. 11/470,931, filed Sep. 7, 2006, Isozaki, et al.
U.S. Appl. No. 11/213,850, filed Aug. 30, 2005, Isozaki et al.
U.S. Appl. No. 11/230,487, filed Sep. 21, 2005, Tezuka et al.
U.S. Appl. No. 12/099,657, filed Apr. 8, 2008, Tezuka, et al.

* cited by examiner

FIG. 7A

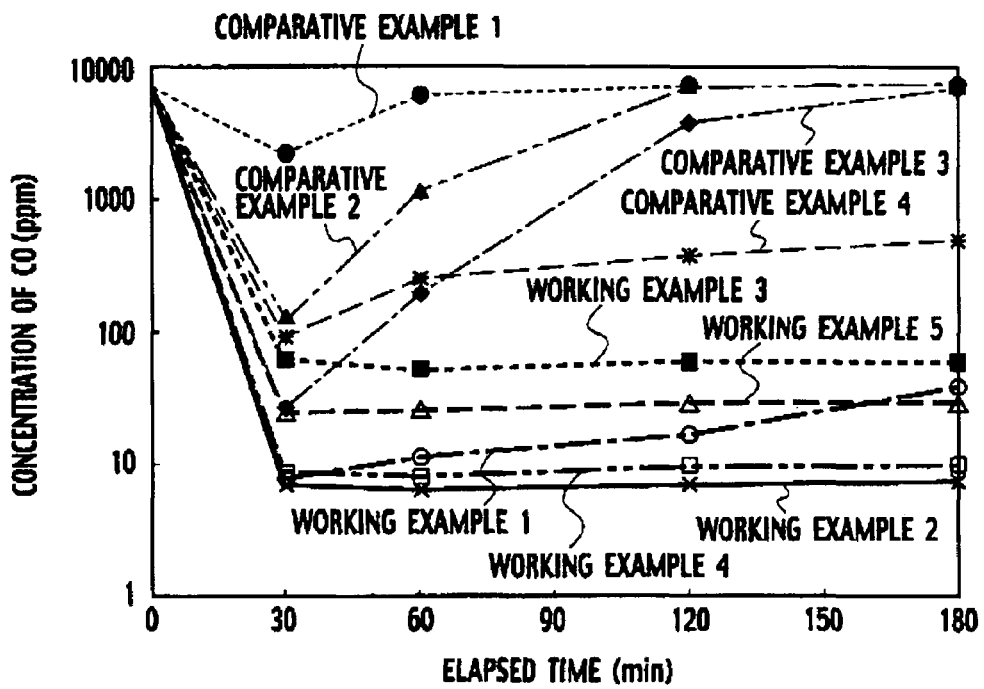

FIG. 7B

| CONCENTRATION OF CO | | | | | (ppm) |
|---|---|---|---|---|---|
| | ELAPSED TIME (min) | | | | |
| | 0 | 30 | 60 | 120 | 180 |
| WORKING EXAMPLE 1 | (7238) | 7.5 | 11 | 16 | 37 |
| WORKING EXAMPLE 2 | (7238) | 6.8 | 6.3 | 6.9 | 7.1 |
| WORKING EXAMPLE 3 | (7238) | 58 | 53 | 61 | 59 |
| WORKING EXAMPLE 4 | (7238) | 8.6 | 8.1 | 9.5 | 9.3 |
| WORKING EXAMPLE 5 | (7238) | 23.9 | 25.8 | 28.5 | 28.1 |
| COMPARATIVE EXAMPLE 1 | (7238) | 2189 | 6235 | 7125 | 7125 |
| COMPARATIVE EXAMPLE 2 | (7238) | 125 | 1182 | 6853 | 7225 |
| COMPARATIVE EXAMPLE 3 | (7238) | 27 | 208 | 3825 | 6845 |
| COMPARATIVE EXAMPLE 4 | (7238) | 89 | 261.5 | 386 | 508 |

Note: The measured values at the elapsed time of 0 min., as obtained just after the starts of the measures, may not precisely reflect concentrations of carbon monoxide contained in actual reformed gases and are hence put in parentheses as (7238).

HYDROGEN GENERATOR AND FUEL CELL SYSTEM

CROSS-REFERENCE TO RELATED APPLICATIONS

This application is based upon and claims the benefit of priority from the prior Japanese Patent Applications No. 2004-250464 (filed Aug. 30, 2004) and No. 2005-247951 (filed Aug. 29, 2005); the entire contents of which are incorporated herein by reference.

The contents of U.S. patent applications Ser. No. 10/740,076 (filed Dec. 18, 2003) and Ser. No. 10/740,144 (filed Dec. 18, 2003) are incorporated herein by reference in their entireties.

BACKGROUND OF THE INVENTION

1. Field of the Invention

The present invention in general relates to a hydrogen generator and a fuel cell system therewith, and particularly relates to a hydrogen generator and a fuel cell system therewith adapted to down-sizing.

2. Description of the Related Art

Applications of fuel cells to power sources of portable electronic equipments are under eager study in these years. As fuels for the fuel cells, light hydrocarbons such as natural gases and naphtha, alcohols such as methanol are considered to be preferable. As well, dimethyl ether is now a subject of study. Direct-type fuel cells directly, namely without any treatment, use some of these fuels, however, the other fuel cells require a treatment of extracting hydrogen from these fuels, which is termed "reforming".

Reforming is typically accomplished by using any catalytic reaction of evaporated fuel with water vapor in a reformer supporting a reforming catalyst preferable to the catalytic reaction. Reformed gas containing hydrogen obtained from any of alcohols and dimethyl ether generally has a carbon monoxide content of about 1% to 2% as a by-product. The carbon monoxide causes deterioration of an anode catalyst of the fuel cell and leads to reduction of electricity generation output. Therefore the carbon monoxide content is necessary to be reduced by any means.

SUMMARY OF THE INVENTION

According to a first aspect of the present invention, a hydrogen generator is provided with: a fuel supplier supplying a fuel including dimethyl ether; a reforming portion reforming the fuel into a reformed gas including hydrogen; a CO-removal portion converting the reformed gas into a product gas including hydrogen, the CO-removal portion including, an internal flow path transmitting the reformed gas, and a methanation catalyst and a hydrogenation catalyst supported on the internal flow path and exposed to the reformed gas.

According to a second aspect of the present invention, a fuel cell system is provided with: a fuel supplier supplying a fuel including dimethyl ether; a reforming portion reforming the fuel into a reformed gas including hydrogen; a CO-removal portion converting the reformed gas into a product gas including hydrogen, the CO-removal portion including, an internal flow path transmitting the reformed gas, and a methanation catalyst and a hydrogenation catalyst supported on the internal flow path and exposed to the reformed gas; and a fuel cell using hydrogen included in the product gas supplied by the CO-removal portion and oxygen included in an atmospheric air to generate electricity.

According to a third aspect of the present invention, a fuel cell system is provided with: a fuel supplier supplying a fuel including dimethyl ether; a reforming portion reforming the fuel into a reformed gas including hydrogen; a CO-shifting portion including, an internal channel transmitting the reformed gas, and a shift catalyst supported on the internal channel and exposed to the reformed gas; a CO-removal portion converting the gas supplied by the CO-shifting portion into a product gas including hydrogen, the CO-removal portion including, an internal flow path transmitting a gas supplied by the CO-shifting portion, and a methanation catalyst and a hydrogenation catalyst supported on the internal flow path and exposed to the gas supplied by the CO-shifting portion; and a fuel cell using hydrogen included in the product gas supplied by the CO-removal portion and oxygen included in an atmospheric air to generate electricity.

According to a fourth aspect of the present invention, a fuel cell system is provided with: a fuel supplier supplying a fuel including dimethyl ether; a reforming catalyst causing a reforming reaction of the fuel into a reformed gas including hydrogen; a shift catalyst causing a shift reaction of the reformed gas; a methanation catalyst causing a methanation reaction of the reformed gas; a hydrogenation catalyst causing a hydrogenation reaction of the reformed gas; and a fuel cell using hydrogen formed by the reforming reaction and the shift reaction from the fuel and oxygen included in an atmospheric air to generate electricity.

BRIEF DESCRIPTION OF THE DRAWINGS

FIGS. 7A and 7B are measurement results of change of carbon monoxide contents comparing working examples and comparable examples.

DETAILED DESCRIPTION OF THE INVENTION

Figure 1:
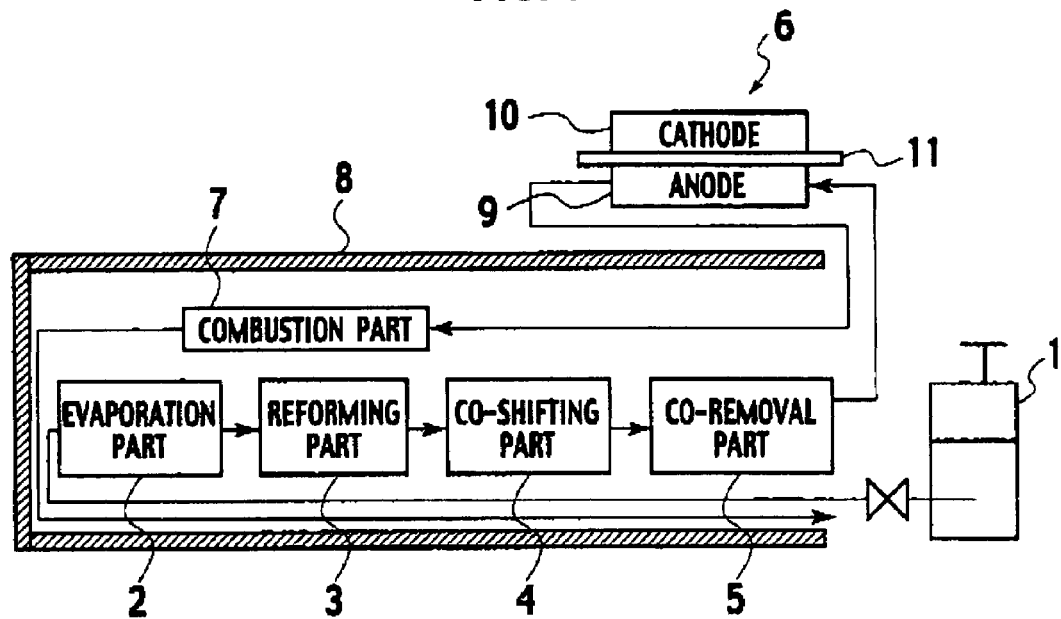
FIG. 1 shows a schematic diagram of a fuel cell system according to a first embodiment of the present invention.

Throughout the specification and claims, some terms are defined and used according to the following definitions. The term "reforming" means a catalytic reaction of any component of a fuel with water vapor to extract hydrogen from the component, which leads to forming a reformed gas containing hydrogen. The term "shift" as a name of a chemical reaction means a catalytic reaction of carbon monoxide and water molecule to be converted into carbon dioxide and hydrogen. The term "hydrogenation" means a catalytic reaction of hydrogen with any unsaturated hydrocarbon, which leads to addition of hydrogen to the unsaturated hydrocarbon. The term "methanation" means a catalytic reaction of carbon monoxide and hydrogen to be converted into methane and water molecule. The terms "reforming catalyst", "shift catalyst", "hydrogenation catalyst" and "methanation catalyst" respectively mean materials to increase rates of the aforementioned corresponding catalytic reactions.

First Embodiment

A first embodiment of the present invention will be described hereinafter with reference to FIGS. 1 to 4.

A fuel supplier 1 contains a mixture of dimethyl ether and water or a mixture of dimethyl ether, water and any of alcohols as a fuel applied to a fuel cell system. As the alcohols, methanol and ethanol are preferable, and more particularly methanol is more preferable since methanol has great solubility with respect to both dimethyl ether and water.

A pressure vessel which is air-tightly sealed so as to keep internal pressure therein can be applied to the fuel supplier 1. The pressure vessel is preferably configured to be detachably attached to the fuel cell system. The pressure vessel is capable of utilizing the internal pressure to discharge and supply the fuel therein to an evaporation part 2 described later.

Stoichiometry in view of ideal reforming of the dimethyl ether requires a mixing ratio of dimethyl ether to water to be 1:3. However, mixing ratios around 1:3 practically leads to a greater carbon monoxide content in the reformed gas. Furthermore, if the water remains to be unreacted, the excess water can be re-used for later described shift reaction or electricity generation. Hence, to add excess water to the mixture, the mixing ratio may be preferably one part of dimethyl ether to 3.5 or more parts of water. Meanwhile, excessively diluted mixture requires relatively large energy for evaporation at a later described evaporation part 2. Hence the mixing ratio is preferably kept to be one part of dimethyl ether to 5.0 or less parts of water, and more preferably one part of dimethyl ether to 4.0 or less parts of water.

The evaporation part 2 is provided and linked with the fuel supplier 1 via a flow line or any other appropriate means. The evaporation part 2 receives the fuel supplied by the fuel supplier 1 and evaporates the fuel by heating.

A reforming part 3 is provided and linked with the evaporation part 2 via a flow line or any other appropriate means. The reforming part 3 receives the fuel in a vapor state from the evaporation part 2 and reforms the fuel into a reformed gas containing hydrogen. There forming part 3 is provided with internal passages therein for transmitting the fuel in the vapor state and a reforming catalyst is supported on inner surfaces of the internal passages so as to be exposed to the fuel flowing therethrough.

A CO-shifting part 4 is provided and linked with the reforming part 3 via a flow line or any other appropriate means. The CO-shifting part 4 receives the reformed gas from the reforming part 3. The reformed gas contains carbon monoxide and carbon dioxide as by-products of the reforming reaction. The carbon monoxide causes deterioration of an anode catalyst of the fuel cell and leads to reduction of electricity generation output. The CO-shifting part 4 brings about a shift reaction to occur to carbon monoxide contained in the reformed gas. The shift reaction shifts one oxygen atom from water molecule to carbon monoxide and thereby carbon monoxide and water molecule are converted into carbon dioxide and hydrogen. Thereby, in a shifted gas as the result of the shift reaction in the CO-shifting part 4, the carbon monoxide content is decreased and the hydrogen content is increased as compared with the reformed gas. The CO-shifting part 4 is provided with internal passages therein for transmitting the reformed gas and a shift catalyst is supported on inner surfaces of the internal passages so as to be exposed to the reformed gas flowing therethrough.

A CO-removal part 5 is provided and linked with the CO-shifting part 4 via a flow line or any other appropriate means. The shifted gas out of the CO-shifting part 4 still contains about 1% to 2% carbon monoxide, which results in the reduction of electricity generation as mentioned above. The CO-removal part 5 receives the shifted gas from the CO-shifting part 4 and brings about a methanation reaction to occur to carbon monoxide contained in the shifted gas. The methanation reaction causes addition of hydrogen to carbon monoxide and thereby carbon monoxide and hydrogen are converted into methane and water. Thereby, in a gas after flowing through the CO-removal part 5, the carbon monoxide content is preferably decreased to 100 ppm or less. The CO-removal part 5 is provided with internal passages therein for transmitting the shifted gas and a methanation catalyst is supported on inner surface of the internal passages so as to be exposed to the shifted gas flowing therethrough.

The gas after being subject to the reforming reaction, the shift reaction and the methanation reaction comes to contain unsaturated hydrocarbons such as olefins caused by these reactions. This fact is a discovery made by the present inventors by means of analytical studies with the fuel cells of prior arts. The present inventors carried out analysis of a reformed gas of the prior fuel cell with utilizing a gas chromatograph and then ascertained that the reformed gas contained ethylene, propylene, butene and some compounds considered as polymeric compounds of them.

Further the present inventors disassembled the fuel cell after power generation and carried out analysis of component parts thereof. By carrying out FT-IR (Fourier Transform Infra-Red spectroscopy) analysis on surfaces of the methanation catalyst after being subjected to the power generation and decreasing a catalytic activity, the present inventors ascertained that some molecules having CHx groups or double bonds, which are identified as unsaturated hydrocarbons, existed on the surfaces. In general, these unsaturated hydrocarbons could not be ascertained to exist in any reformed gases generated from the other fuels, such as methane gas, propane gas, kerosene, naphtha and such.

More specifically, it came to be light that the unsaturated hydrocarbons such as the aforementioned ethylene and propylene and/or any oligomers generated by polymerization of these olefins are strongly adsorbed to the surfaces on the methanation catalyst after decreasing the catalytic activity. It is presumed that these substances poison active sites of the methanation catalyst or block pores where the active sites exist and it leads to the decrease in the catalytic activity of the methanation catalyst.

Then the present inventors have intensively brought about studies intended for solving the problem of the catalytic activity decrease and resultantly found that, if the reformed gas containing unsaturated hydrocarbons such as ethylene and propylene is hydrogenated with utilizing hydrogenation catalyst, the catalytic activity decrease of the methanation catalyst can be suppressed and progress of the catalytic activity decrease can be made very little even in long time use. This phenomenon is thought to result because the saturated carbons generated from the unsaturated hydrocarbons such as ethylene and propylene by the hydrogenation are weaker in adsorption force to the catalytic active sites than the original unsaturated hydrocarbons and are hence unlikely to poison the active sites of the methanation catalyst. Another cause is thought to be that the saturated hydrocarbons generated by the hydrogenation, as compared with the original unsaturated hydrocarbons, are unsusceptible to polymerization and hence unlikely to block the pores where the active sites of the methanation catalyst exit. The present invention had been achieved on the basis of these findings. In accordance with the present embodiment, the inner surfaces of the internal passages of the CO-removal part 5 supports a hydrogenation catalyst to hydrogenate the unsaturated hydrocarbons such as olefins.

For removing the olefins, the CO-removal part 5 is further provided with a hydrogenation catalyst supported on the inner surfaces of the internal passages thereof so that the hydrogenation catalyst is exposed to the shifted gas flowing therethrough. The hydrogenation reaction promoted by the hydrogenation catalyst causes addition of hydrogen to olefins and thereby the olefins are converted to saturated hydrocarbons.

A fuel cell 6 is provided and linked with the CO-removal part 5 via a flow line or any other appropriate means. The fuel cell 6 is provided with an anode 9, a cathode 10 and an electrolyte membrane 11 put therebetween. The reformed gas reformed at the reforming part 3 flows through the CO-shifting part 4, the CO-removal part 5 and the flow lines intervened among them so as to be converted to a product gas adapted to electricity generation and is then supplied to the anode 9 of the fuel cell 6. The cathode 10 receives the atmospheric air. The fuel cell 6 uses hydrogen contained in the product gas and oxygen contained in the atmospheric air to generate electricity.

A combustion part 7 is provided and linked with the fuel cell 6 via a flow line or any other appropriate means. In the fuel cell 6, hydrogen contained in the product gas mainly reacts with oxygen to form water, but is in part left unreacted. The combustion part 7 brings about combustion of the unreacted hydrogen with oxygen in the air. The combustion part 7 uses heat generated by the combustion to heat the evaporation part 2, the reforming part 3, the CO-shifting part 4 and the CO-removal part 5. With the intention of uniform heating and uniform temperatures, as well as protection of surrounding parts sensitive to heat, a thermal insulator 8 substantially encloses the evaporation part 2, the reforming part 3, the CO-shifting part 4, the CO-removal part 5 and the combustion part 7.

Figure 2:
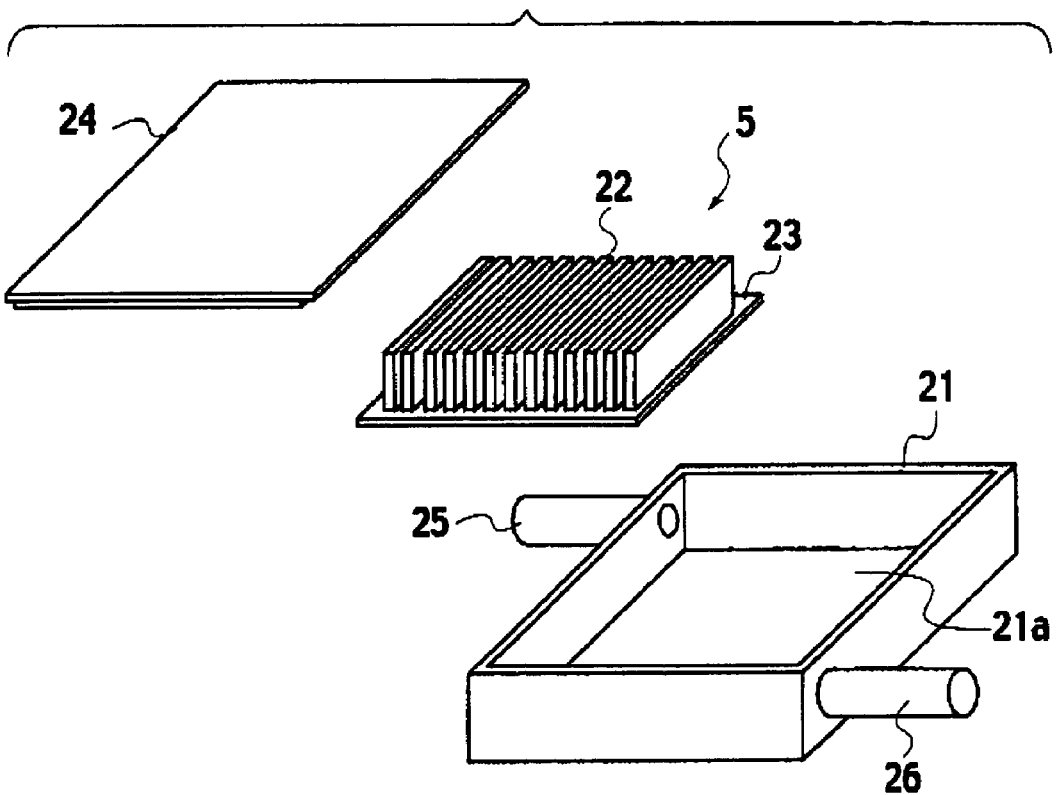
FIG. 2 is a perspective exploded view of a part of the fuel cell system.

Next, more detailed description of the reforming part 3 will be given hereinafter with reference to FIG. 2. The reforming part 3 is provided with internal passages, which are branched from one passage, run in parallel with each other and further merge into one passage, for example. FIG. 2 shows an illustration of such parallel internal passages. Besides the illustration, a serpentine internal passage, which is composed of plural passages serpentinely linked with each other, or any other passages can be applied. Inner surfaces of the internal passages support the reforming catalyst consisting essentially of a first metal supported on solid acid.

Further detailed descriptions will be given with respect to the reforming catalyst. As the first metal, one or more noble metals selected from the group of Pt, Pd, Rh and Cu are preferably applied. As the solid acid, γ-alumina is preferably applied. Still preferably, Cu/ZnO/γ-alumina or a mixture of Pd/ZnO and γ-alumina can be applied.

Dimethyl ether is subject to a first step reaction of hydrolysis represented by the below equation (1) and then decomposed into methanol.

   (1)

The generated methanol is next subject to a second step reaction of water vapor reforming represented by the below equation (2) and then reformed into hydrogen and carbon dioxide.

   (2)

A solid acid such as γ-alumina is effective as a catalyst in the first step reaction and metals such as Pt, Pd, Rh and Cu are effective as a catalyst in the second step reaction. It is ascertained by analysis of the reformed gas that a rate of methanol generation is increased in a case where the first metal content is below 0.25 wt %. This means that a rate of the water vapor reforming reaction of methanol goes below a sufficient level. Meanwhile, in a case where the first metal content is beyond 1.0 wt %, the first metal content has small effect on the rate of methanol generation since the water vapor reforming reaction of methanol serially progresses. Adding the first metal beyond 1.0 wt % is not preferable in view of material cost. Therefore the first metal content is preferably regulated in 0.25 wt % or more and 1.0 wt % or less.

Any noble metal is preferably applied to the first metal in view of improving corrosion resistance of the reforming part 3. Still preferably a temperature of the reforming part 3 is regulated in a range of 200 to 400 degrees C. since the reforming catalyst functions with sufficient efficiency in the temperature range.

Detailed description of the CO-shifting part 4 will be described hereinafter. The CO-shifting part 4 is provided with internal passages of parallel branching ways or serpentine ways as similar to the reforming part 3, in which the evaporated fuel flows. Inner surfaces of the internal passages support the shift catalyst consisting essentially of a noble metal including Pt supported on solid base. The shift catalyst increases a rate of the shift reaction by which carbon monoxide is converted into carbon dioxide in accordance with the below equation (3) and increases a generation rate of hydrogen.

   (3)

Further detailed descriptions will be given with respect to the shift catalyst. Alumina supporting Ce or Re can be applied to the solid base. Alternatively, alumina supporting any selected from the group of K, Mg, Ca and La can be applied to the solid base with a similar advantage. Further alternatively, any of Pd and Ru can be applied in place of Pt with a similar advantage.

Publicly known catalysts of Cu/ZnO series can be further applied. However, any catalyst supporting any noble metal including Pt, Pd and Ru is preferably applied in view of improving corrosion resistance of the CO-shifting part 4. Still preferably the CO-shifting part 4 is kept under temperature control so that a surface temperature of the shift catalyst is regulated in a range of 200 to 300 degrees C. since the shift catalyst functions with sufficient efficiency in the temperature range.

Detailed description of the CO-removal part 5 will be described hereinafter. The CO-removal part 5 is provided with internal passages of parallel branching ways or serpentine ways as similar to the reforming part 3 and the CO-shifting part 4, in which the evaporated fuel flows. Inner surfaces of the internal passages support the methanation catalyst and hydrogenation catalyst, including Ru.

The reformed gas after being reformed at the reforming part 3 and further subject to the shift reaction at the CO-shifting part 4 contains carbon monoxide and carbon dioxide as by-products as well as hydrogen. As mentioned above, the carbon monoxide causes deterioration of the anode catalyst of the fuel cell and leads to reduction of electricity generation output. The CO-removal part 5 brings about the methanation reaction represented by the below equation (4) so as to methanate and hence remove the carbon monoxide so that the content thereof is decreased to 100 ppm or less before the gas is supplied to the fuel cell 6.

   (4)

Further detailed descriptions will be given with respect to the methanation catalyst. The methanation catalyst is composed of a proper metal supported in a support, which is capable of forming a carbonylated metal species, as described in U.S. patent applications Ser. No. 10/740,076 and Ser. No. 10/740,144, which are incorporated herein by reference. The metal is preferably selected from the group consisting of Ru, Rh, Pt, Pd, Re, Ni, Fe, Co, Pb, Sn, Ag, Ir, Au, Cu, Mn, Zn, Zr, Mo, other metals that form metal-carbonyl species and combinations thereof. Because it is believed that the methanation reaction occurs within support pores, the pores must be so dimensioned as to accommodate a fully carbonylated metal complex. And thus the pore size requirement will vary depending on the metal species selected for the catalyst. However, it has generally been observed that, if the pore size is smaller than or is significantly larger than the dimensions of the fully carbonylated metal complex, the resulting catalyst does not show the desired selectivity for carbon monoxide methanation.

A representative catalyst made in accordance with the present embodiment of the present invention has a pore diameter of at least 6.3 Å. Meanwhile, the "fully-carbonylated metal complex" is defined herein for the purpose of calculating the volume needed within the support pore as the metal complex with the maximum number of carbon monoxide ligands that the metal prefers to accommodate in its lowest energy state. As a support capable of having such pores, $Al_2O_3$ and zeolite can be exemplified. If a total pore volume occupying the support is too small, the support cannot support enough amount of metal, and if too large, the support may reduce its mechanical property. Therefore the total pore volume is preferably 0.3 to 1.0 $cm^3/g$ as a ratio of a total pore volume divided by a weight of the support. Furthermore too small content of supported Ru leads to an insufficient catalytic activity and too large content leads to blocking of the pores, which decreases the catalytic activity. Therefore the content of supported Ru is preferably 0.5 to 4.5 wt %.

The metal may be added to the support by any means known in the art for intercalating the metal into the support pores, such as impregnation, incipient wetness, immersion and spraying methods. It is recommended to apply any metal source free of any elements typically considered as catalytic poisons, such as S, Cl, Na, B, I and combinations thereof, although not a requirement to embodiment of the invention. Applicable catalyst may be prepared by applying metal sources including such poisons, however care must be taken to wash the poisons from the catalyst during production of the catalyst.

More specifically, the methanation catalyst preferably includes $Ru/Al_2O_3$, Ru/zeolite or any including $Ru/Al_2O_3$ or Ru/zeolite as a main component and supporting any element selected from the group of Mg, Ca, K, La, Ce and Re. As examples of the zeolite, mordenite-type zeolite, β-type zeolite, Y-type zeolite, ZSM-5 zeolite, faujasite are exemplified and can be preferably applied. More preferably, any material consisting essentially of Ru/zeolite or including Ru/zeolite as a main component can be applied to the methanation catalyst.

Further detailed descriptions will be given with respect to the hydrogenation catalyst. The hydrogenation catalyst preferably includes $Pt/Al_2O_3$, $Pd/Al_2O_3$ or any including $Pt/Al_2O_3$ or $Pd/Al_2O_3$ as a main component and supporting any element selected from the group of Mg, Si, Ca, Fe, Cu, Zn, Na, K, Li, Rb, Cs, Sr and Ba. These elements are more preferable because these elements, when modifying $Pt/Al_2O_3$ or $Pd/Al_2O_3$, suppress progress of a reverse shift reaction ($H_2+CO_2 \rightarrow CO+H_2O$) as compared with cases of any other elements and hence suppress regeneration of carbon monoxide from carbon dioxide generated at the reforming part 3.

The aforementioned hydrogenation catalyst including $Pt/Al_2O_3$ or $Pd/Al_2O_3$ as a main component, if applied in combination with the methanation catalyst, is capable of effectively suppressing the decrease of the catalytic activity of the methanation catalyst without increase of carbon monoxide because it is mostly unlikely to promote the unnecessary reverse shift reaction.

Still preferably the CO-removal part 5 is kept under temperature control so that surface temperatures of the methanation catalyst and the hydrogenation catalyst are regulated in a range of 200 to 300 degrees C., more preferably in a range of 225 to 250 degrees C. since the methanation catalyst and the hydrogenation catalyst function with sufficient efficiency in the temperature range.

A method of providing the methanation catalyst and the hydrogenation catalyst in the CO-removal part 5 will be described hereinafter. The inner surfaces of the CO-removal part 5 can be provided with a mixture of the methanation catalyst and the hydrogenation catalyst. This configuration can be modified so that the inner surfaces are in part provided with the methanation catalyst and in the other part provided with the hydrogenation catalyst. Alternatively, that configuration can be modified so that an upstream portion of the inner surfaces of the CO-removal part 5 is provided with the hydrogenation catalyst and a downstream portion is provided with the methanation catalyst, where the inner surfaces of the CO-removal part 5 are classified into the upstream portion (near the CO-shifting part 4) and the downstream portion (near the fuel cell 6) with respect to a flowing direction of the gas.

Preferably, in comparison of ratios of the methanation catalyst to the hydrogenation catalyst in the mixtures, the downstream portion with respect to the flowing direction (near the fuel cell 6) is formed to be richer in the methanation catalyst than the upstream portion (near the CO-shifting portion 4). The gas supplied by the CO-shifting part 4 to the CO-removal part 5 contains unsaturated hydrocarbons. This configuration increases the hydrogenation reaction in particular at the upstream portion and the methanation reaction in particular at the downstream portion so as to effectively promote removal of carbon monoxide and hence extend the life of the methanation catalyst.

Next, detailed descriptions will be given with respect to the fuel cell 6. The fuel cell 6 is provided with an anode 9 comprised of a porous sheet on which a carbon-black powder supporting Pt is kept by means of a porous resin adhesive such as polytetrafluoroethylene (PTFE), a cathode 10 similarly comprised of a porous sheet on which a carbon-black powder supporting Pt is kept by means of a porous resin adhesive such as polytetrafluoroethylene (PTFE), and an electrolyte membrane 11 comprised of a fluorocarbon polymer having a cation-exchange group such as a sulfonic acid group and a carboxylic acid group, for example "Nafion" commercially available as a trade name (DuPont Corp.), put therebetween. The porous sheets may includes a sulfonate-type perfluorocarbon polymer, or a fine particle coated with the polymer.

The hydrogen supplied to the anode 9 reacts in accordance with the below equation (5).

$$H_2 \rightarrow 2H^+ + 2e^- \qquad (5)$$

Meanwhile, the oxygen supplied to the cathode 10 reacts in accordance with the below equation (6).

$$\tfrac{1}{2}O_2 + 2H^+ + 2e^- \rightarrow H_2O \qquad (6)$$

Further, detailed descriptions will be given with respect to the combustion part 7.

The combustion part 7 is provided with internal passages of parallel branching ways or serpentine ways, in which an exhaust gas after electricity generation flows. Inner surfaces of the internal passages support a combustion catalyst consisting essentially of Pt, Pd or alumina supporting any noble metal such as Pt and Pd. The reason why the noble metal is applied is that a noble metal prevents oxidizing and deterioration of the combustion catalyst without any other supplementary devices for prevention of oxidizing and deterioration of the fuel cell at a time of stall thereof.

Structures of the reforming part 3, the CO-shift part 4, CO-removal part 5 and the combustion part 7 will be described hereinafter. The CO-removal part 5 will be exemplarily described below and descriptions about the reforming part 3, the CO-shift part 4 and the combustion part 7 will be omitted. Any of these parts may be structured equivalently to the CO-removal part 5 except for the width and the length of the internal passages, which are appropriately optimized depending on types of the catalysts and the reaction rates.

FIG. 2 shows a perspective exploded view of the CO-removal part 5. The CO-removal part 5 is provided with a reaction vessel 21 as a chassis, and a flow path member 23 housed therein. The flow path member 23 has grooves 22 through which gas flows.

The reaction vessel 21 is preferably, at least in part, made of any highly thermally conductive material for improvement of heat transfer from the combustion part 7 where combustion heat is generated to the interior of the CO-removal part 5. As such a material, aluminum, copper, aluminum alloys and copper alloys can be exemplified. Stainless steels are also preferable as the material because of its excellent corrosion resistance, though the thermal conductivity is not so high as compared with the above materials.

The reaction vessel 21 is provided with a fitting portion 21*a*, which is a recess formed in the reaction vessel 21 and the flow path member 23 is fitted into. The fitting portion 21*a* is formed in such a way as to form an internal flow path therein linking an inflow port 25 and an outflow port 26 when the flow path member 23 is fitted into the fitting portion 21*a*.

The reaction vessel 21 can be formed using any usual machining method or any usual forming method. As the usual machining method, an electrical discharge machining method and a milling machining method can be exemplified. As the usual forming method, forging and casting can be applied. Moreover, the machining method and the forming method can be used in combination, for example the reaction vessel 21 without the inflow port 25 and the outflow port 26 is formed by casting, later subject to machining such as drilling so that a pair of through holes are formed and further subject to welding so that tubes are respectively fixed to the through holes to form the inflow port 25 and the outflow port 26.

The flow path member 23 is preferably, at least in part, made of any highly thermally conductive material for improvement of heat transfer from the combustion part 7 where combustion heat is generated to the interior of the CO-removal part 5. As such a material, aluminum, copper, aluminum alloys and copper alloys can be exemplified. Stainless steels are also preferable as the material because of its excellent corrosion resistance, though the thermal conductivity is not so high as compared with the above materials.

The flow path member 23 is provided with a plurality of grooves 22 of about 500 μm (100 μm to 1000 μm) in width, each of which penetrates the flow path member 23 from one side to the other side. The grooves 22 are adjacent to and substantially parallel with each other. The grooves 22 are preferably formed by usual machining or forming from the base material of the flow path member 23.

As an example of usual machining, electrical discharge machining using a wire (wire-cutting) can be exemplified. The wire-cutting is accomplished by generating electrical discharge between a tool electrode of a thin metal wire and an object for machining and moving the tool electrode or the object correspondingly to an objective shape. Alternatively, abrasive machining using a disc blade made of abrasive particles such as diamond particles solidified with resin can be applied. The abrasive machining is accomplished by rotating the disc blade at high speed and then touching and moving the disc blade to an object so that portions where the rotating disc blade touches are worn off to give an objective shape. The wire-cutting and the abrasive machining are greatly adapted to forming grooves having opened both ends, such as the grooves 22, in a short time.

As an example of usual forming, forging can be exemplified. The forging is accomplished by pressing and deforming a bar or a bulk of metal with a die or a tool so that the bar or the bulk forms an objective shape. The forging provides the metal with hardening so as to improve mechanical properties thereof, as well as deformation of the metal so as to obtain an objective shape. Alternatively, casting can be applied. The casting is accomplished by pouring molten metal into a casting die having a cavity of an objective shape and removing the casting die after enough cooling so that the objective shape of the metal is obtained. The forging and the casting are greatly adapted to forming complex shapes such as the flow path member 23.

Figure 3:
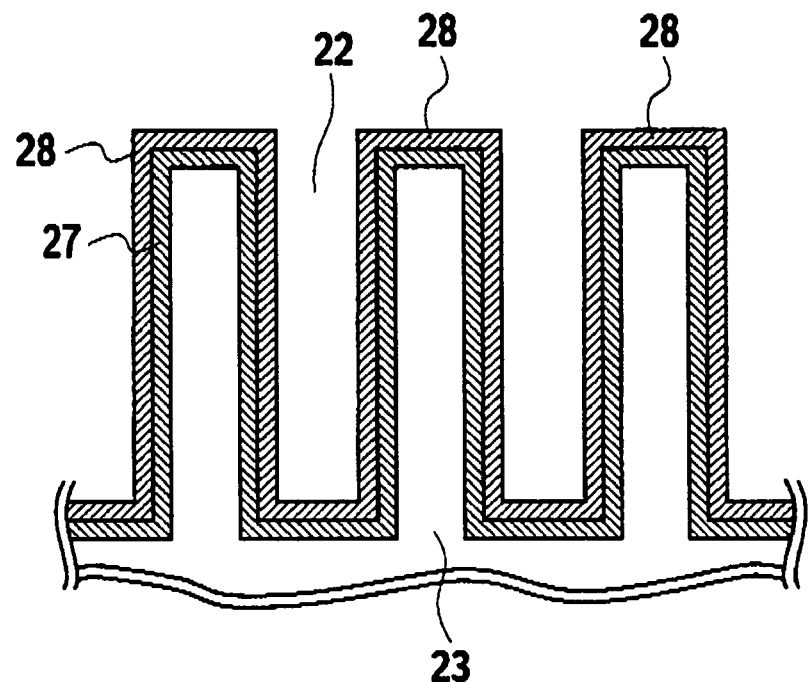
FIG. 3 is a sectional side view of a flow path structure housed in the part.

The internal surfaces of the grooves 22 support the methanation catalyst and the hydrogenation catalyst. FIG. 3 shows a sectional side view enlarging a part of the flow path member 23. In a case where the surfaces of the flow path member 23 consists of an aluminum alloy, the surface of the flow path member 23 including the internal surfaces of the grooves 22 is subject to anodizing so as to form a porous alumina (γ-alumina) layer 27. Next, a catalyst layer 28 is made to be supported on the porous alumina layer 27 by using a publicly known catalyst-support method such as a wash-coating method, a sol-gel method and an impregnation method. As mentioned above, the mixture of the methanation catalyst and the hydrogenation catalyst can be supported in the catalyst layer 28. In a case where the surfaces of the flow path member 23 are formed of a stainless steel, the flow path member 23 is baked at a high temperature so that roughness of the surfaces of the flow path member 23 including the inner surfaces of the grooves 22 is increased. The surfaces having greater roughness are next subject to a publicly known method for forming a catalyst layer on a support to form the catalysts supported on the surfaces.

A lid 24 is provided for sealing the fitting portion 21*a* of the reaction vessel 21. The lid 24 is so structured as to seal the fitting portion 21*a* when the lid 24 is fixed to the reaction vessel 21 by, for example, laser-welding. Providing the lid 24 on the reaction vessel 21 forms an inner flow path therein linking the inflow port 25 and the outflow port 26, respectively as an inlet and an outlet for a fluid.

The lid 24 can be formed using any usual machining method or any usual forming method. As the usual machining method, an electrical discharge machining method and a milling machining method can be exemplified. As the usual forming method, forging and casting can be applied.

The lid 24 is preferably, at least in part, made of any highly thermally conductive material for improvement of heat transfer from the combustion part 7 where combustion heat is generated to the interior of the CO-removal part 5. As such a material, aluminum, copper, aluminum alloys and copper alloys can be exemplified. Stainless steels are also preferable as the material because of its excellent corrosion resistance, though the thermal conductivity is not so high as compared with the above materials.

In the fuel cell system in accordance with the aforementioned description, unsaturated hydrocarbons such as olefins generated in the course of the reforming reaction, the shift reaction and the methanation catalyst are hydrogenated since the CO-removal 5 supports the hydrogenation catalyst. Therefore, the unsaturated hydrocarbons are prevented from touching with the methanation catalyst so that inhibition of the methanation reaction of carbon monoxide is reduced. More specifically, the fuel cell system can be operated without interruption for a long time.

The above description has been given to one embodiment in which the grooves 22 have about 500 µm (100 µm to 1000 µm) width, however, the width of the grooves 22 may be wider to few mm. In such a case, the catalyst (any of the reforming catalyst, the shift catalyst, the methanation catalyst and the hydrogenation catalyst) may not be supported on the surfaces of the grooves 22 but filled in the grooves 22.

Moreover, the above description has been given to one embodiment in which the inner surfaces of the internal flow path of the reforming part 3 supports the reforming catalyst only, however, a mixture of the reforming catalyst and the shift catalyst may be supported thereon. This configuration suppresses a phenomenon of increase in a yield of carbon monoxide relative to the carbon number because of the co-existence of the reforming catalyst and the shift catalyst.

The methanation catalyst and the hydrogenation catalyst may be separated in the porous alumina layer 27 of the CO-removal part 5 in such a way that one part of the porous alumina layer 27 supports the methanation catalyst and the other part supports the hydrogenation catalyst.

Figure 4:
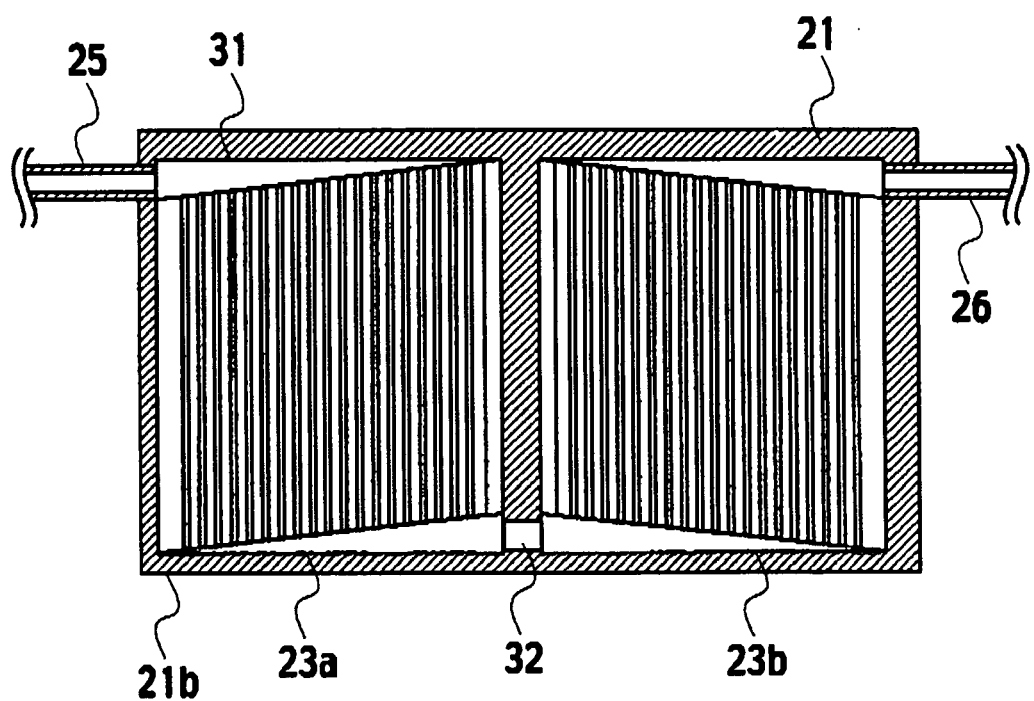
FIG. 4 is a sectional top view of the part of the fuel cell system.

In this case, as shown in FIG. 4, the reaction vessel 21b may be provided with two fitting portions, which are respectively provided with a flow path member 23a and a flow path member 23b. FIG. 4 shows a sectional view of a CO-removal part 5 in accordance with a modified embodiment. The grooves formed on the flow path member 23a is provided with the hydrogenation catalyst and the grooves of the flow path member 23b is provided with the methanation catalyst. The reformed gas supplied by the inflow port 25 first flows through the flow path member 23a supporting the hydrogenation catalyst and is subject to the hydrogenation reaction of unsaturated hydrocarbon contained therein. Subsequently the gas flows through the flow path member 23b supporting the methanation catalyst and is subject to the methanation reaction of carbon monoxide contained therein. Then the gas having lower carbon monoxide content flows out of the outflow port 26.

The above-mentioned configuration leads to prevention of the reformed gas from touching with the methanation catalyst before the unsaturated hydrocarbon is subject to the hydrogenation reaction. Thereby inhibition of the methanation reaction of carbon monoxide by the unsaturated hydrocarbon is effectively reduced.

Alternatively, both the flow path members 23a and 23b are provided with mixtures of the hydrogenation catalyst and the methanation catalyst. Further, the mixture of the methanation catalyst and the hydrogenation catalyst supported on the flow path member 23b, namely at the downstream portion, is formed to be richer in the methanation catalyst than the mixture supported on the flow path member 23a, namely at the upstream portion. This configuration leads to elongation of a time for the flowing gas to touch with the hydrogenation catalyst and the methanation catalyst. More specifically, inhibition of the methanation reaction is further reduced and furthermore the CO-removal part 5 can be down-sized.

Moreover, as shown in FIG. 4, clearances 31 may be held between the reaction vessel 21b and the flow path members 23a and 23b and widths of the clearances 31 may be made greater toward the inflow port 25, the outflow port 26 and a connection path 32. This configuration reduces unevenness among the pressures of the reformed gases respectively flowing through the grooves 22. More specifically, unevenness among the flow rates of the reformed gases respectively flowing through the grooves 22 is reduced and hence efficiency of the CO-removal part 5 is improved.

Second Embodiment

Figure 5:
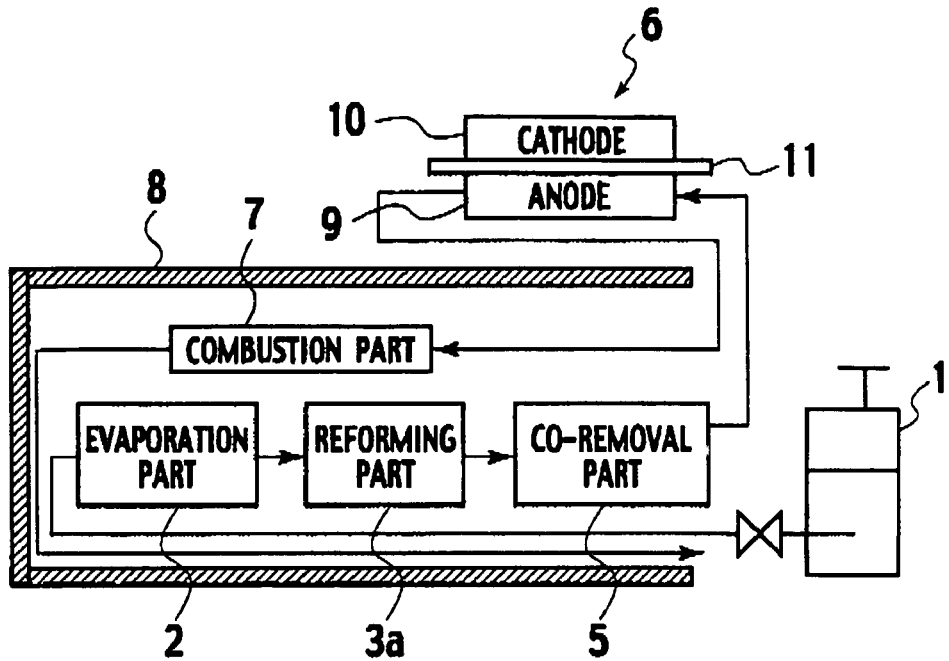
FIG. 5 shows a schematic diagram of a fuel cell system according to a second embodiment of the present invention.

A second embodiment of the present invention will be described hereinafter with reference to FIG. 5. In the following description, substantially the same elements as any of the aforementioned elements are referenced with the same numerals and the detailed descriptions are omitted.

A reforming part 3a is provided and linked with the evaporation part 2 via a flow line or any other appropriate means. The reforming part 3a receives the fuel in a vapor state from the evaporation part 2 and reforms the fuel into a reformed gas containing hydrogen. The reforming part 3a is provided with internal passages therein for transmitting the fuel in the vapor state and a reforming catalyst is supported on inner surfaces of the internal passages so as to be exposed to the fuel flowing therethrough. A shift catalyst is further supported on the inner surfaces of the internal passages.

More detailed description of the reforming part 3a will be given. The reforming part 3a is provided with the internal passages for transmitting the evaporated gas, which are branched from one passage, run in parallel with each other and further merge into one passage, for example. Alternatively, the internal passages are formed in a serpentine passage, which is composed of plural passages serpentinely linked with each other.

A method of providing the reforming catalyst and the shift catalyst in the reforming part 3a will be described hereinafter. The inner surfaces of the reforming part 3a can be provided with a mixture of the reforming catalyst and the shift catalyst. Alternatively, the reforming catalyst and the shift catalyst may be separated in the reforming part 3a in such a way that one part of the inner surfaces of the reforming part 3a supports the reforming catalyst and the other supports the shift catalyst.

Furthermore, the mixture of the reforming catalyst and the shift catalyst supported on the inner surfaces at a downstream portion (near the CO-removal part 5) thereof is preferably set richer in the shift catalyst than the mixture at an upstream portion (near the evaporation part 2). A content of carbon monoxide in the evaporated fuel gas subject to the reforming reaction increases toward the downstream portion. Therefore such a ratio change of the shift catalyst toward the downstream portion results in the reforming reaction being promoted at the upstream portion and the shift reaction is mainly promoted at the downstream portion, which leads to improvement of efficiency of the reforming reaction and the shift reaction and further leads to improvement of efficiency of the fuel cell system.

Since the reforming part 3a is configured as such, the reformed gas is prevented from touching with the methanation catalyst before the unsaturated hydrocarbon is subject to the hydrogenation reaction, similarly to the first embodiment more specifically, inhibition of the methanation reaction of carbon monoxide by the unsaturated hydrocarbon is effectively reduced.

The same configuration as the CO-removal part 5 shown in FIG. 4 may be applied to the reforming part 3a. The flow path member 23a can be provided with the reforming catalyst and the flow path member 23b can be provided with the shift catalyst. According to this configuration, the evaporated fuel gas is first subject to the reforming reaction and next subject to the shift catalyst, thereby the hydrogen content in the reformed gas is effectively increased and hence efficiency of the fuel cell system is improved.

Third Embodiment

Figure 6:
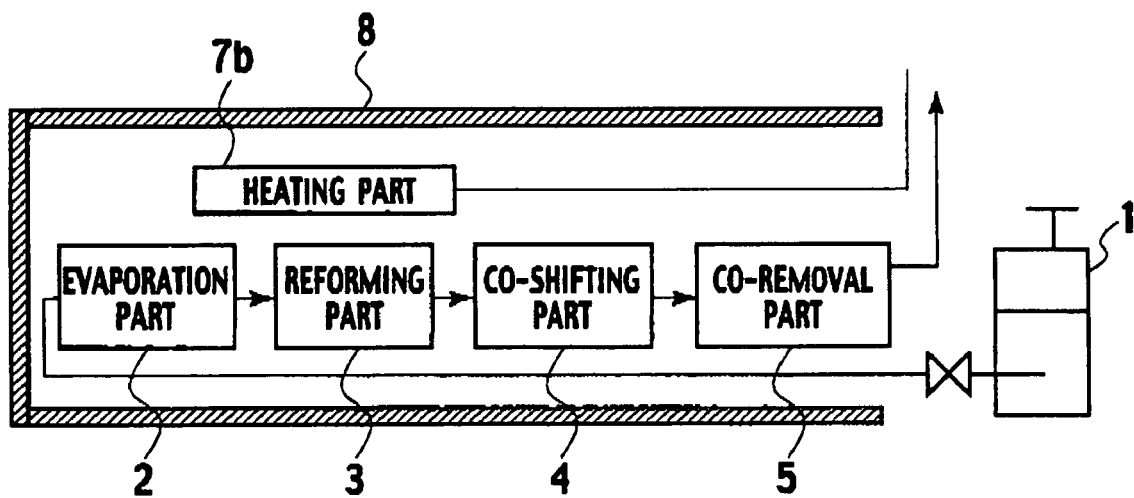
FIG. 6 shows a schematic diagram of a fuel cell system according to a third embodiment of the present invention.

A third embodiment of the present invention will be described hereinafter with reference to FIG. 6. In the following description, substantially the same elements as any of the aforementioned elements are referenced with the same numerals and the detailed descriptions are omitted.

A heating part 7b is provided in accordance with the present embodiment. For example, a cartridge heater in which a metal wire having high resistance is coiled around an insulator can be applied to the heating part 7b. The heating part 7b receives energy supplied by the exterior, for example electricity in a case of the cartridge heater. The heating part 7b uses the supplied energy to generate heat for heating the evaporation part 2, the reforming part 3, the CO-shifting part 4 and the CO-removing part 5.

Since the fuel cell system is configured as such, the reformed gas is prevented from touching with the methanation catalyst before the unsaturated hydrocarbon is subject to the hydrogenation reaction, similarly to the first embodiment. More specifically, inhibition of the methanation reaction of carbon monoxide by the unsaturated hydrocarbon is effectively reduced.

The hydrogen generator and the fuel cell system in accordance with any of the above embodiments can be applied to various applications for generating hydrogen and generating electricity. For example, in case where a selective oxidation catalyst is applied to the CO-removal part, air-supply means such as a pump for supplying air containing oxygen is necessary. However, in a case where the methanation catalyst is applied to the CO-removal part, the air-supply means can be omitted and hence the hydrogen generator and the fuel cell system come to be adapted to down-sizing. Therefore, the fuel cell system is greatly adapted to a portable power source and also a compact power source for portable or compact electronic devices such as a note-book PC.

WORKING EXAMPLE 1

Experiments was carried out with respect to removal of carbon monoxide contained in a reformed gas for a fuel cell system using the CO-removal part 5 shown in FIG. 2 to give the following examples. Aluminum was applied to a material for the reforming part 3, the CO-shifting part 4 and the CO-removal part 5. The flow path members respectively having forty-five grooves 22 of 500 μm in width were applied to the reforming part 3, the CO-shifting part 4 and the CO-removal part 5. The internal surfaces of the grooves 22 of the respective flow path members were anodized and γ-alumina layers had been respectively formed thereon. Areas of the inner surfaces supporting the respective catalysts were respectively about 250 $cm^2$.

The reforming part 3 was formed in such a way that Pt was impregnated into the γ-alumina layer obtained by anodizing to 0.5 wt % Pt by using platinic chloride solution.

The CO-shifting part 4 was formed in such a way that commercially available Pt/γ-alumina crushed and made into slurry was wash-coated on the γ-alumina layer obtained by anodizing and further calcined.

The CO-removal part 5 was formed in such a way that the Ru/zeolite catalyst was applied to the methanation catalyst and γ-alumina supporting 0.03 wt % Pd was applied to the hydrogenation catalyst. 20 g of the hydrogenation catalyst was mixed to 100 g of the methanation catalyst. More specifically, a ratio of the weight of the hydrogenation catalyst (M2) to the weight of the methanation catalyst (M1) was represented by:

$M2/M1=0.2$

Subsequently, the mixture was crushed and made into slurry, and wash-coated on the γ-alumina layer obtained by anodizing, and further calcined.

The reforming part 3, the CO-shifting part 4 and the CO-removal part 5 as formed in accordance with the above steps and further the evaporation part 2 was interlinked with each other. The fuel was supplied to the evaporation part 2 and the reformed gas out of the CO-removal part 5 was provided for measurement of carbon monoxide concentration. As the fuel, a mixture of dimethyl ether, water and methanol was applied. The mixing ratio of the fuel is that a methanol content was 10% in volume and a molar ratio of dimethyl ether to water was 1:4.

The temperatures were set as follows;
the evaporation part 2: 150 degrees C.,
the reforming part 3: 350 degrees C.,
the CO-shifting part 4: 250 degrees C., and
the CO-removal part 5: 250 degrees C.

The reformed gas out of the CO-removal part 5 was subject to gas chromatography. Then, a $N_2$ gas was applied to an internal standard gas therefor and supplied to the outlet side of the CO removal part 5. A flow rate of the $N_2$ gas was set in 50 cc/min. The fuel cell system applied to the experiment was operated in a condition that 250 cc/min of hydrogen gas, corresponding to 20 W of electricity generation, was generated, and carbon monoxide content in the reformed gas was measured. FIG. 7 shows the result.

As comparative examples of prior-art fuel cell systems, the same experiments were carried out with respect to the following four fuel cell systems.

COMPARATIVE EXAMPLE 1

The CO-removal part 5 was formed in such a way that the Ru/zeolite catalyst was applied to the methanation catalyst and no hydrogenation catalyst was applied. The methanation catalyst was crushed and made into slurry, and wash-coated on the γ-alumina layer obtained by anodizing, and further calcined. The configuration, the operation condition and the measurement conditions were equivalent to the above working example 1.

COMPARATIVE EXAMPLE 2

The CO-removal part 5 was formed in such a way that the Ru/zeolite catalyst was applied to the methanation catalyst and γ-alumina was applied instead of the hydrogenation catalyst. Even amounts of the methanation catalyst and the γ-alumina were mixed with each other. More specifically, a ratio of the weight of the γ-alumina (M3) to the weight of the methanation catalyst (M1) was represented by:

$M3/M1=1.0$

Subsequently, the mixture was crushed and made into slurry, and wash-coated on the γ-alumina layer obtained by anodizing, and further calcined. The configuration, the operation condition and the measurement conditions were equivalent to the above working example 1.

COMPARATIVE EXAMPLE 3

The CO-removal part 5 was formed in such a way that the Ru/zeolite catalyst was applied to the methanation catalyst and γ-alumina supporting 0.03 wt % Pd was applied to the hydrogenation catalyst. 10 g of the hydrogenation catalyst was mixed to 100 g of the methanation catalyst. More specifically, a ratio of the weight of the hydrogenation catalyst (M2) to the weight of the methanation catalyst (M1) was represented by:

$M2/M1=0.1$

Subsequently, the mixture was crushed and made into slurry, and wash-coated on the γ-alumina layer obtained by anodizing, and further calcined. The configuration, the operation condition and the measurement conditions were equivalent to the above working example 1.

COMPARATIVE EXAMPLE 4

The CO-removal part 5 was formed in such a way that the selective oxidation catalyst was applied instead of the methanation catalyst. γ-alumina supporting 1.0 wt % Ru was applied to the methanation catalyst. The selective oxidation catalyst was crushed and made into slurry, and wash-coated on the γ-alumina layer obtained by anodizing, and further calcined. The configuration, the operation condition and the measurement conditions were equivalent to the above working example 1.

COMPARATIVE EXAMPLE 5

The CO-removal part 5 was formed in such a way that the selective oxidation catalyst was applied instead of the methanation catalyst. γ-alumina supporting 1.0 wt % Ru was applied to the methanation catalyst. The selective oxidation catalyst was crashed and made into slurry, and wash-coated on the γ-alumina layer obtained by anodizing, and further calcined. The other configuration, the operation condition and the measurement conditions were equivalent to the above working example 1.

As shown in FIG. 7, the carbon monoxide concentrations of the fuel cell systems of the comparative examples 1 through 4 went beyond 100 ppm after 60 minutes elapsed from start of the operation. Meanwhile, the carbon monoxide concentration of the fuel cell system of the working example 1 was stable below 100 ppm even after 180 minutes elapsed from start of the operation and it could be ascertained that the CO-removal part 5 was kept functioning effectively.

Moreover, the fuel cell system of the comparative example 5 was intended to be provided for the experiment, however an air pump must be provided so as to supply the air containing oxygen to the CO-removal part 5, thereby the fuel cell system came to be large-sized and made complex. The experiment was abandoned. More specifically, the fuel cell system of the working example 1 can be considered compact and simple as compared with one of the comparative example 5. Therefore the fuel cell system of the working example 1 can be considered adapted to down-sizing, particularly in a case where the fuel cell system is applied to compact portable devices (for example, portable data-processing devices such as a personal computer and communication devices such as a mobile phone).

WORKING EXAMPLE 2

The CO-removal part 5 was formed in such a way that the Ru/zeolite catalyst was applied to the methanation catalyst and γ-alumina supporting 0.03 wt % Pd was applied to the hydrogenation catalyst. 100 g of the hydrogenation catalyst was mixed to 100 g of the methanation catalyst. More specifically, a ratio of the weight of the hydrogenation catalyst (M2) to the weight of the methanation catalyst (M1) was represented by:

$M2/M1=1.0$

Subsequently, the mixture was crushed and made into slurry, and wash-coated on the γ-alumina layer obtained by anodizing, and further calcined. The configuration, the operation condition and the measurement conditions were equivalent to the above working example 1.

As shown in FIG. 7, the carbon monoxide concentration of the fuel cell system of the working example 2 was stable below 100 ppm even after 180 minutes elapsed from start of the operation and it could be ascertained that the CO-removal part 5 was kept functioning effectively. Moreover, the carbon monoxide concentration of the fuel cell system of the working example 1 was stable below 100 ppm but increased as the time advanced. In contrast, the carbon monoxide concentration of the fuel cell system of the working example 2 had few change below 100 ppm as the time advanced. The reason may be that the ratio of the hydrogenation catalyst to the methanation catalyst is 1:1, which is greater than one of the working example 1.

WORKING EXAMPLE 3

The CO-removal part 5 was formed in such a way that the Ru/zeolite catalyst was applied to the methanation catalyst and γ-alumina supporting 0.3 wt % Pt was applied to the hydrogenation catalyst. 100 g of the hydrogenation catalyst was mixed to 100 g of the methanation catalyst. More specifically, a ratio of the weight of the hydrogenation catalyst (M2) to the weight of the methanation catalyst (M1) was represented by:

$M2/M1=1.0$

Subsequently, the mixture was crushed and made into slurry, and wash-coated on the γ-alumina layer obtained by anodizing, and further calcined. The configuration, the operation condition and the measurement conditions were equivalent to the above working example 1.

As shown in FIG. 7, the carbon monoxide concentration of the fuel cell system of the working example 3 was stable below 100 ppm even after 180 minutes elapsed from start of the operation and it could be ascertained that the CO-removal part 5 was kept functioning effectively. Moreover, the carbon monoxide concentration of the fuel cell system of the working example 1 was stable below 100 ppm but increased as the time advanced. In contrast, the carbon monoxide concentration of the fuel cell system of the working example 3 had few change below 100 ppm as the time advanced, similarly to the working example 2. The reason may be that the ratio of the hydrogenation catalyst to the methanation catalyst is 1:1, which is greater than one of the working example 1.

WORKING EXAMPLE 4

Two flow path members, each of which has twenty grooves 22 of 500 μm in width, were applied. One of the flow path members includes the methanation catalyst and the other includes the hydrogenation catalyst. These flow path members are housed in the CO-removal part 5. Areas of the inner surfaces supporting the respective catalysts were respectively about 111 cm².

The CO-removal part 5 was formed in such a way that the Ru/zeolite catalyst was applied to the methanation catalyst and γ-alumina supporting 0.03 wt % Pd was applied to the hydrogenation catalyst. The flow path member including the methanation catalyst was disposed downstream of the other flow path member including the hydrogenation catalyst. In other words, the hydrogenation catalyst was disposed upstream of the methanation catalyst. Further, a ratio of the weight of the hydrogenation catalyst (M2) to the weight of the methanation catalyst (M1) was regulated to be:

$$M2/M1=1.0$$

Meanwhile, the catalysts were respectively crushed and made into slurry and wash-coated on the γ-alumina layers obtained by anodizing, and further calcined. The configuration, the operation condition and the measurement conditions were equivalent to the above working example 1.

As shown in FIG. 7, the carbon monoxide concentration of the fuel cell system of the working example 4 was stable below 100 ppm even after 180 minutes elapsed from start of the operation and it could be ascertained that the CO-removal part was kept functioning effectively. Moreover, the carbon monoxide concentration of the fuel cell system of the working example 1 was stable below 100 ppm but increased as the time advanced. In contrast, the carbon monoxide concentration of the fuel cell system of the working example 4 had few change below 100 ppm as the time advanced, similarly to the working example 2. The reason may be that the ratio of the hydrogenation catalyst to the methanation catalyst is 1:1, which is greater than one of the working example 1.

WORKING EXAMPLE 5

Three flow path members, one of which has forty-five grooves 22 of 500 μm in width, and each of the rest of which has twenty grooves 22, were applied. One flow path member having forty-five grooves 22 supports the methanation catalyst and the others having twenty grooves 22 respectively support the hydrogenation catalyst. These flow path members are housed in the CO-removal part 5. An area of the inner surfaces supporting the methanation catalyst was about 250 cm² and areas of the inner surfaces supporting the hydrogenation catalyst were respectively about 111 cm².

The CO-removal part 5 was formed in such a way that the Ru/γ-alumina catalyst was applied to the methanation catalyst and γ-alumina supporting 0.03 wt % Pd was applied to the hydrogenation catalyst.

The methanation catalyst was formed in such a way that Ru was impregnated into the γ-alumina layer obtained by anodizing to 1.0 wt % Ru by using ruthenium chloride solution. The hydrogenation catalyst was formed in such a way that Pd was impregnated into the γ-alumina layer obtained by anodizing to 0.03 wt % Pd by using palladium chloride solution.

The flow path member including the methanation catalyst was disposed downstream of the other flow path members including the hydrogenation catalyst. In other words, the hydrogenation catalyst was disposed upstream of the methanation catalyst. Further, a ratio of the weight of the hydrogenation catalyst (M2) to the weight of the methanation catalyst (M1) was regulated to be:

$$M2/M1=0.2$$

The configuration, the operation condition and the measurement conditions were equivalent to the above working example 1.

As shown in FIG. 7, the carbon monoxide concentration of the fuel cell system of the working example 5 was stable below 100 ppm even after 180 minutes elapsed from start of the operation and it could be ascertained that the CO-removal part 5 was kept functioning effectively. Moreover, the carbon monoxide concentration of the fuel cell system of the working example 1 was stable below 100 ppm but increased as the time advanced. In contrast, the carbon monoxide concentration of the fuel cell system of the working example 5 had few change below 100 ppm as the time advanced. The reason may be that the Ru content in the hydrogenation catalyst is 1.0 wt %, which is greater than one of the working example 1.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A hydrogen generator comprising:
a fuel supplier supplying a fuel comprising dimethyl ether;
a reforming portion reforming the fuel into a reformed gas comprising hydrogen;
a CO-removal portion converting the reformed gas comprising hydrogen into a product gas comprising hydrogen having a CO concentration of 100 ppm or less, wherein
the CO-removal portion comprises an internal flow path transmitting the reformed gas, and
a methanation catalyst and a hydrogenation catalyst are supported on the internal flow path and exposed to the reformed gas.

2. The hydrogen generator of claim 1, wherein the methanation catalyst comprises at least one catalyst selected from the group consisting of ruthenium supported on alumina and ruthenium supported on zeolite.

3. The hydrogen generator of claim 1, wherein the hydrogenation catalyst comprises palladium supported on alumina.

4. A fuel cell system comprising:
a fuel supplier supplying a fuel comprising dimethyl ether;
a reforming portion reforming the fuel into a reformed gas comprising hydrogen;
a CO-removal portion converting the reformed gas comprising hydrogen into a product gas comprising hydrogen having a CO concentration of 100 ppm or less, and
a fuel cell
wherein
the CO-removal portion comprises an internal flow path transmitting the reformed gas,
a methanation catalyst and a hydrogenation catalyst are supported on the internal flow path and exposed to the reformed gas; and
the fuel cell is supplied with the hydrogen included in the product gas having a CO concentration of 100 ppm or less supplied by the CO-removal portion and with oxygen included in an atmospheric air to generate electricity.

5. The fuel cell system of claim 4, wherein the reforming portion comprises an internal passage transmitting the fuel, and
a shift catalyst supported on the internal passage is exposed to the fuel.

6. The fuel cell system of claim 4, wherein a downstream portion of the internal flow path of the reforming portion with respect to a direction of flow of the reformed gas is richer in the methanation catalyst than an upstream portion of the internal flow path.

7. The fuel cell system of claim 4, wherein $M2/M1 \geqq 0.2$, wherein M1 represents a weight of the methanation catalyst in the CO removal portion and M2 represents a weight of the hydrogenation catalyst in the CO removal portion.

8. The fuel cell system of claim 4, wherein the methanation catalyst comprises a material selected from the group consisting of ruthenium supported on alumina and ruthenium supported on zeolite.

9. The fuel cell system of claim 4, wherein the hydrogenation catalyst comprises palladium supported on alumina.

10. A fuel cell system comprising:
a fuel supplier supplying a fuel comprising dimethyl ether;
a reforming portion reforming the fuel into a reformed gas comprising hydrogen;
a CO-shifting portion comprising:
an internal channel transmitting the reformed gas, and
a first shift catalyst supported on the internal channel and exposed to the reformed gas;
a CO-removal portion converting the gas supplied by the CO-shifting portion into a product gas comprising hydrogen having a CO concentration of 100 ppm or less, wherein the CO-removal portion comprises:
an internal flow path transmitting a gas supplied by the CO-shifting portion,
a methanation catalyst supported on the internal flow path and exposed to the gas supplied by the CO-shifting potion and
a hydrogenation catalyst supported on the internal flow path and
exposed to the gas supplied by the CO-shifting portion; and
a fuel cell which is supplied with the hydrogen included in the product gas having a CO concentration of 100 ppm or less supplied by the CO-removal portion and with oxygen included in an atmospheric air to generate electricity.

11. The fuel cell system of claim 10, wherein the reforming portion further comprises a second shift catalyst supported on the internal passage and exposed to the fuel.

12. The fuel cell system of claim 10, wherein
a downstream portion of the internal flow path of the CO-removal portion with respect to a flowing direction of the gas supplied by the CO-shifting portion is richer in the methanation catalyst than an upstream portion of the internal flow path of the CO-removal portion.

13. The fuel cell system of claim 10, wherein $M2/M1 \geqq 0.2$, wherein M1 represents a weight of the methanation catalyst in the CO-removal portion and M2 represents a weight of the hydrogenation catalyst in the CO-removal portion.

14. The fuel cell system of claim 10, wherein the hydrogenation catalyst of the CO-Removal portion comprises palladium supported on alumina.

15. The fuel cell system of claim 10, wherein the methanation catalyst comprises:
a support comprising at least one selected from the group consisting of alumina and zeolite; and
ruthenium supported on the support.

16. The fuel cell system of claim 15, wherein the zeolite is at least one selected from the group consisting of mordenite-type zeolite, β-type zeolite, Y-type zeolite, ZSM-5 zeolite and faujasite.

17. The fuel cell system of claim 15, wherein the support of the methanation catalyst comprises pores of greater than 6.3 Å in pore diameter and from 0.3 cm$^3$/g to 1 cm$^3$/g in a total pore volume ratio to a weight of the support.

18. The fuel cell system of claim 15, wherein a weight per cent of ruthenium is from 0.5 wt % to 4.5 wt %.

19. A fuel cell system comprising:
a fuel supplier supplying a fuel comprising dimethyl ether;
a system to convert the fuel comprising dimethyl ether to a product fuel comprising hydrogen having a CO concentration of 100 ppm or less; and
a fuel cell supplied with the product fuel comprising hydrogen having a CO concentration of 100 ppm or less and oxygen included in an atmospheric air to generate electricity;
wherein the system to convert the fuel comprising dimethyl ether to a product fuel comprising hydrogen having a CO concentration of 100 ppm or less comprises:
a reforming catalyst causing a reforming reaction of the fuel into a reformed gas comprising hydrogen;
a shift catalyst causing a shift reaction of the reformed gas;
a methanation catalyst causing a methanation reaction of the reformed gas;
a hydrogenation catalyst causing a hydrogenation reaction of the reformed gas.

20. The fuel cell system of claim 19, wherein a ratio of the methanation catalyst to the hydrogenation catalyst increases toward a downstream portion with respect to a flow direction from the fuel supplier to the fuel cell of the reformed gas.

21. The fuel cell system of claim 19, wherein $M2/M1 \geqq 0.2$, wherein M1 represents a weight of the methanation catalyst and M2 represents a weight of the hydrogenation catalyst.

22. The fuel cell system of claim 19, wherein the methanation catalyst comprises a material selected from the group consisting of ruthenium supported on alumina and ruthenium supported on zeolite.

23. The fuel cell system of claim 19, wherein the hydrogenation catalyst comprises palladium supported on alumina.

* * * * *